United States Patent
Guenthner et al.

(10) Patent No.: US 7,462,681 B1
(45) Date of Patent: Dec. 9, 2008

(54) POLYCYANURATE COMPOSITIONS

(75) Inventors: Andrew J. Guenthner, Ridgecrest, CA (US); Gregory R. Yandek, Ridgecrest, CA (US); David J. Irvin, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 53 days.

(21) Appl. No.: 11/239,443

(22) Filed: Sep. 19, 2005

(51) Int. Cl.
*C08G 64/00* (2006.01)
*C08G 63/02* (2006.01)

(52) U.S. Cl. .................. 528/196; 521/27; 524/492; 528/125; 528/126; 528/210

(58) Field of Classification Search .............. 521/27; 524/492; 528/125, 126, 196, 210
See application file for complete search history.

(56) References Cited

U.S. PATENT DOCUMENTS 6,394,264 B2 * 5/2002 Riviello, Jr. .............. 206/213.1

FOREIGN PATENT DOCUMENTS

| JP | 5548205 | * | 4/1980 |
| WO | WO 9608530 | * | 3/1996 |

* cited by examiner

*Primary Examiner*—Terressa M Boykin
(74) *Attorney, Agent, or Firm*—Brian F. Drazich; Charlene A. Haley

(57) ABSTRACT

A polycyanurate composition (I), wherein "n" is a positive integer of about 1 to about 10, and wherein R, R', and R" comprising at least one of C, H, N, O, F, Si, P, S, Cl, Br, I, and any combination thereof. A method of making a polycyanurate composition (I) including, providing at least one semi-aliphatic polycarbonate (V), wherein R comprises at least one of C, H, N, O, F, Si, P, S, Cl, Br, I, providing at least one uncured reactive thermoset monomer, dissolving the polycarbonate in a solvent with a high vapor pressure or suspending the polycarbonate directly into the reactive monomer, mixing the liquefied polycarbonate with the uncured reactive thermoset monomer into a homogeneous liquid component, curing the liquid component into a viscous component, and exposing the cured component to temperatures of about 50° C. to about 400° C. forming tricyanurate linkages in the polycyanurate composition (I).

13 Claims, 3 Drawing Sheets

POLYCYANURATE COMPOSITIONS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention relates to semi-aliphatic polycarbonates as low moisture toughening agents with cyanate ester resins for making polycyanurate compositions, and more specifically, polycyanurate compositions that impart significant improvements in mechanical toughness while maintaining strength, heat resistance, moisture resistance, and other desirable properties.

Figure 1:
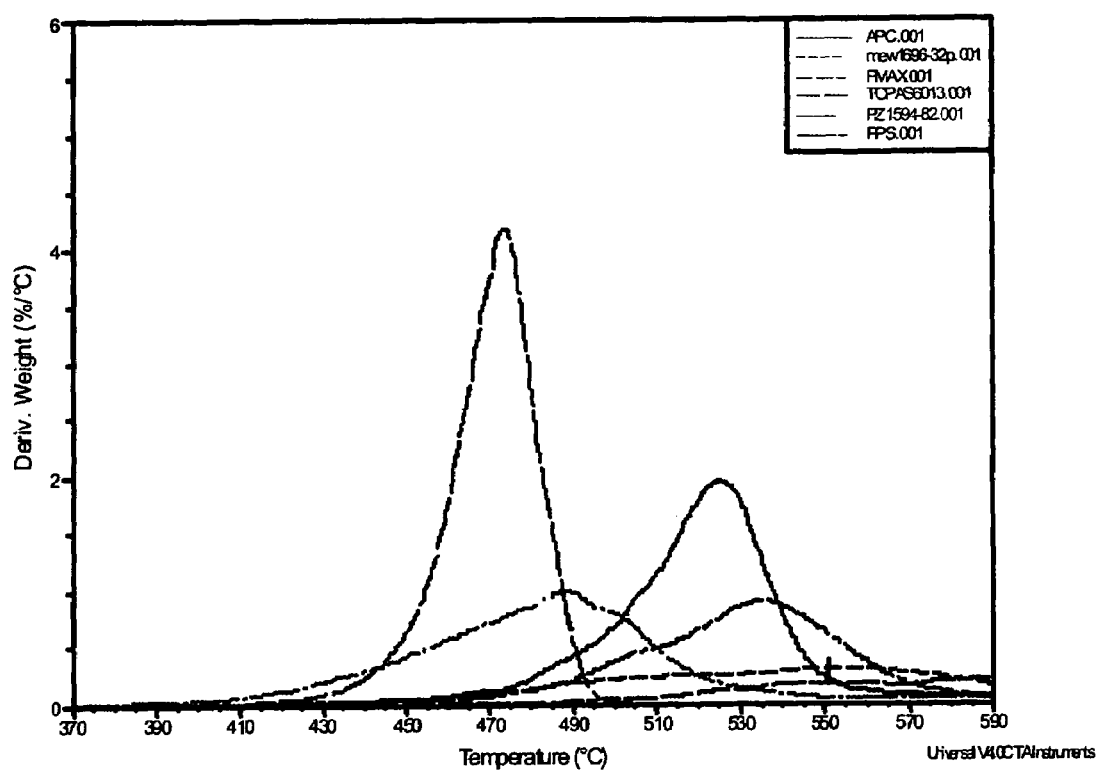
FIG. 1 is a graph illustrating a thermogravimetric analysis of various candidate toughener materials, according to embodiments of the invention.

It is to be understood that the foregoing general description and the following detailed description are exemplary and explanatory only and are not to be viewed as being restrictive of the present invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS

The invention relates to polycyanurate compositions and method for making the same. One aspect of the invention relates to a polycyanurate composition (I) which includes, wherein "n"

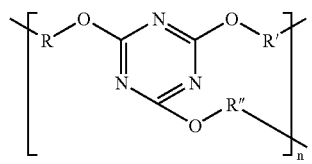

having a positive integer of about 1 to about 10, and wherein R, R', and R" comprises at

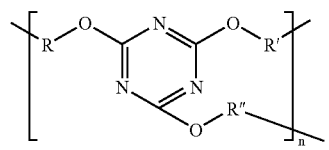

least one of C, H, N, O, F, Si, P, S, Cl, Br, I, and any combination thereof. In another embodiment, the polycyanurate composition (I) includes, "n" being a positive integer that includes a macromolecule weight of up to about 100 tons, and wherein R, R', and R" comprises at least one of C, H, N, O, F, Si, P, S, Cl, Br, I, and any combination thereof.

In another embodiment of the invention, a polycyanurate composition (1) includes, at least one semi-aliphatic polycarbonate, wherein the polycarbonate is liquefied, at least one uncured reactive thermoset monomer, wherein the liquefied polycarbonate is mixed with the uncured reactive thermoset monomer into a homogeneous liquid component, wherein the liquid component is cured into a viscous component, and wherein the cured component is exposed to temperatures of about 50° C. to about 400° C. to form tricyanurate linkages in the polycyanurate composition, as represented in example structure (I).

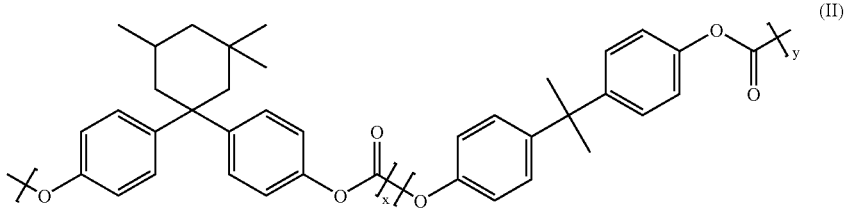

The embodiments described above include, but are not limited to the following examples. The semi-aliphatic polycarbonate is a polycarbonate having two or more co-monomers wherein the polycarbonate has a molecular weight of about 1,000 to about 100,000 g/mol. The semi-aliphatic polycarbonate is a polycarbonate having an amorphous polycarbonate including a random co-polymer of polybisphenol A carbonate and 4,4'-(3,3,5-trimethylcyclohexylidene) diphenol carbonate, as represented in example structure (II).

In embodiments, the semi-aliphatic polycarbonate is a polycarbonate in the form of a powder, pellets, finely ground suspension, and any combination thereof. In other embodiments, the composition includes the polycarbonate being liquefied through liquefaction by dissolution in a solvent with a high vapor pressure in the reactive monomer. When a solvent is utilized, the solvent includes at least one of methylene chloride, chloroform, carbon tetrachloride, 1,2-dichloroethane, 1,1,2-trichloroethane, 1,1,2,2-tetrachloroethane, cyclopentanone, cyclohexanone, acetone, methyl ethyl ketone, diethyl ether, tetrahydrofuran, acetonitrile, butyl acetate, 1,4-dioxane, ethyl acetate, ethylene glycol dimethyl ether, methyl sulfoxide, 1-pentanone, pyridine, tetrachloroethylene, and solvents having similar polarity and boiling point range characteristics. In another embodiment, the polycarbonate is liquefied through liquefaction by suspension directly into the reactive monomer.

The uncured reactive thermoset monomer includes at least one of reactive cyanate ester monomer, as represented in example structure (III), wherein R includes at least one of C, H, N,

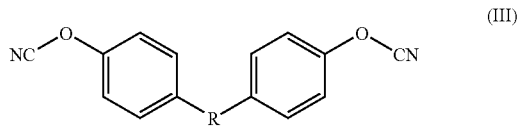

(III)

O, F, Si, P, S, Cl, Br, I, and any combination thereof. In embodiments, the uncured reactive thermoset monomer is a reactive cyanate ester monomer of the novalac type, as represented in example structure (IV).

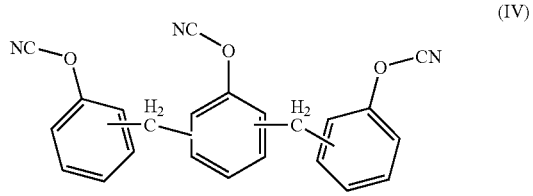

(IV)

The homogeneous liquid component is in the amount ranging from about 1 part to about 100 parts of the polycarbonate to about 100 parts of the reactive thermoset monomer. The polycyanurate composition further includes at least one liquid penetrating material having at least one of a polymeric, ceramic, and metal in the form of an insert, sheet, flake, powder, and fibrous matter. The liquid component is heated up to about 200° C. to reach a viscosity of the liquid component to about 0.1 centipoise to about 1000 centipoises. The length of time cured of the cured component depends on variables including ratios and chemical compositions of polycarbonates to the solvent to the reactive monomer to produce a composition having a structure of dispersed or inter-connected domains of polycarbonate with a characteristic length scale ranging from about 0.001 micrometers to about 10 micrometers.

Another aspect of the invention relates to a method of making a polycyanurate composition (I) including, providing at least one semi-aliphatic polycarbonate, as represented in example

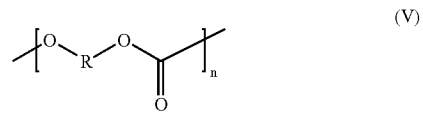

(V)

structure (V), wherein R includes at least one of C, H, N, O, F, Si, P, S, Cl, Br, I, and any combination thereof, providing at least one uncured reactive thermoset monomer, dissolving the polycarbonate in a solvent (methylene chloride) with a high vapor pressure or suspending the polycarbonate directly into the reactive monomer, mixing the liquefied polycarbonate with the uncured reactive thermoset monomer into a homogeneous liquid component, curing the liquid component into a viscous component, and exposing the cured component to temperatures of about 50° C. to about 400° C. forming tricyanurate linkages in the polycyanurate composition, as represented in example structure (I).

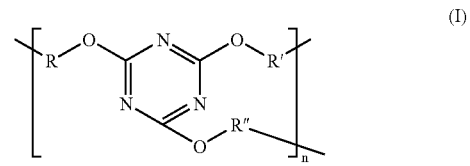

(I)

Embodiments of the method of making the polycyanurate composition further includes, providing at least one liquid penetrating material including at least one of a polymeric, ceramic, and metal in the form of an insert, sheet, flake, powder, and fibrous matter. In embodiments, the curing includes heating the liquid component up to about 200° C. to reach a viscosity of the liquid component to about 0.1 centipoise to about 1000 centipoises. In other embodiment, curing the cured component depending on variables including ratios and chemical compositions of polycarbonates to the solvent to the reactive monomer producing a composition having a structure of dispersed or interconnected domains of polycarbonate with a characteristic length scale ranging from about 0.001 micrometers to about 10 micrometers.

Prophetic Examples

A semialiphatic polycarbonate in embodiments, includes the amorphous polycarbonate being a structure of a random copolymer of polybisphenol A carbonate and 4,4'-(3,3,5-trimethylcyclohexylidene) diphenol carbonate. The two co-monomers enable a balance between mechanical strength and thermal stability (provided by the aromatic segment) on the one hand, and moisture resistance and deformability on the other. By judicious choice of monomers and molecular weight (typically 2,000-100,000 g/mol), one skilled in the art would obtain a polycarbonate composition that best balances these properties depending on the desired application. The polycarbonates are utilized in the form of powder or pellets, and ground readily into a fine suspension that is easily dispersed.

In order to formulate the resin system, the finely dispersed polycarbonate is liquefied. In embodiments, liquefication is accomplished either by dissolution in a solvent with a high vapor pressure, including methylene chloride, or by suspending directly into a reactive monomer. Once liquefied, the polycarbonate is added to a mixture of reactive cyanate ester monomers in which $R_1$ and $R_2$ is attached and dissolves into the mixture, which becomes a homogeneous liquid. Typical addition levels for the polycarbonate range from 1 part to 100 parts per 100 parts of reactive monomer, by weight. Upon heating to moderate temperatures, from 25° C. to 200° C. depending on the application, the liquid becomes of a viscosity (0.1-1000 centipoises) such that it is easily poured into a mold and out of which any dissolved air may escape in less time (hours) than needed to complete the curing reaction. The mold includes any type of polymeric, ceramic, or metal insert, sheet, flake, powder, or fibrous matter, into which the liquid penetrates to form a structure generally free of voids.

When exposed to elevated temperatures (50° C. to 400° C.) for a period of up to 100 hours (typically in the form of a schedule of increasing temperatures for set periods of time), the cyanate ester monomers react to form tricyanurate linkages, thereby joining together individual molecules to form a macromolecular "thermoset" architecture. In embodiments during the curing process, the miscibility of the amorphous polycarbonate begins to decrease rapidly until a point is reached at which a single phase is no longer thermodynamically stable. At this point, phase separation is initiated, and separate domains of polycarbonate and polycyanurate resin form. One skilled in the art of forming structures by this method is able to adjust the curing schedule, along with the ratios and chemical compositions of polycarbonate to solvent to reactive monomer, in such a manner as to obtain, for a given type of structure, a structure having of either dispersed or interconnected domains of polycarbonate with a characteristic length scale from 0.01-10 micrometers. The phase-separated structure with the previously described characteristic length scale will impart significant improvements in mechanical toughness ([S. A. Srinivasan, J. C. Abed, J. E. McGrath, ACS Polym. Prepr., Polym. Chem. 33(2) (1992), 325; S. A. Srinivasan, S. S. Joardar, D. B. Priddy Jr., T. C. Ward, J. E. McGrath, Polym. Mat. Sci. Eng. 70 (1994), 93; S. A. Srinivasan, J. E. McGrath, J. Appl. Polym. Sci. 65 (1997) 167; S. A. Srinivasan, J. E. McGrath, Polymer 39 (1998), 2415]) while maintaining strength, heat resistance, moisture resistance, and other desirable properties.

By including reactive cyanate ester monomers of the novalac type into the chemical structure, this refinement permits one skilled in the art to obtain the best possible balance of properties for the system. Without the use of the amorphous polycarbonate; however, the desirable characteristic of low moisture absorption found in many polycyanurate resin systems is difficult to obtain without significantly sacrificing other important properties. The use of the semi-aliphatic polycarbonate structure thus represents a balancing of properties in the toughening thermoplastic, which then allows for a much more desirable optimum set of properties in the formulated resin or composite system. (TOP=TOPAS 6013, PI82=PZ1594-82 polyimide, APC=amorphous polycarbonate (Aldrich 43,058-7), PPS=polyphenylene sulfide (China Lake), Note: PT-30 has 0.23% moisture at 75% rh., *=manufacturer's data). Table 1 shows that APC has about the same moisture uptake as PT-30, unlike the polyimide or polyphenylene sulfide. The TOPAS 6013 has a very poor solubility

TABLE 1

Properties of Selected Candidate Toughening Thermoplastics

| Property | TOP | PI82 | APC | PPS |
|---|---|---|---|---|
| Rank for Use | n/a | 4 | 3 | 2 |
| Solubility | poor | good | fair | poor |
| % Moisture 55% rh | | 0.52 | | 0.16 |
| % Moisture 65% rh | 0.06 | | 0.12 | |
| % Moisture 74% rh | | 0.95 | 0.25 | 0.14 |
| % Moisture 93% rh | | 1.62 | 0.23 | 0.34 |
| CTE ppm/° C. | 60*° | | 55 | 56* |
| Tg ° C. | 140 | 229 | 183 | 220* |
| Strain to fail* | 2.7% | | | 30% |
| Impact* | | | | 0.13 |

Figure 2:
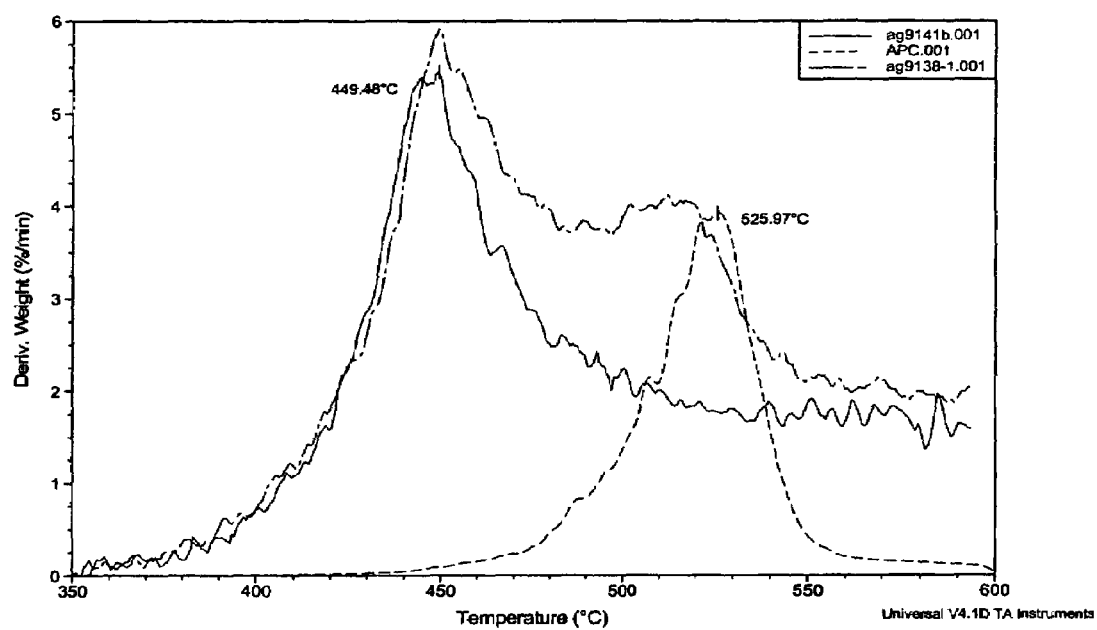
FIG. 2 is a graph illustrating a thermogravimetric analysis of PT-30 cyanate ester, amorphous polycarbonate, and formulated phase-separated mixture, according to embodiments of the invention.
Figure 3:
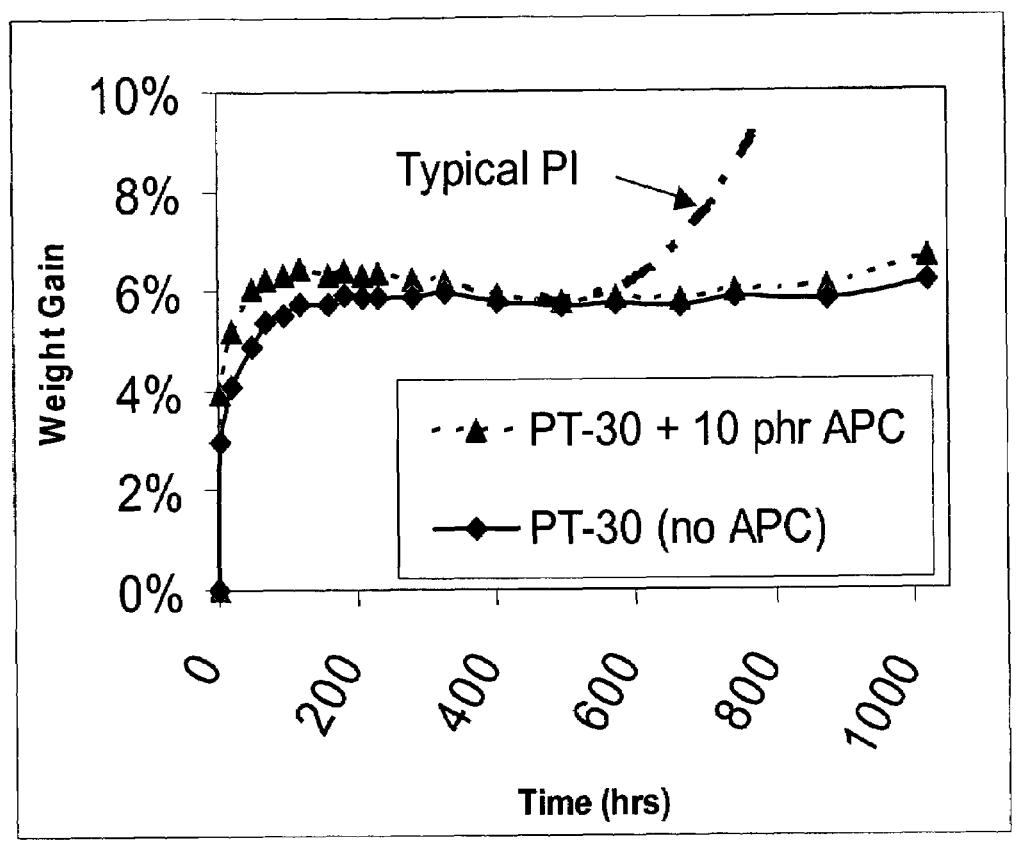
FIG. 3 is a graph illustrating that the addition of 10 phr APC does not significantly affect the weight gain of PT-30, according to embodiments of the invention.

FIG. 1 shows the thermogravimetric analysis of various candidate toughener materials. The semi-aliphatic polyimide (bright green), the TOPAS (pink), show significant degradation below 450° C., making them likely to harm the thermal properties of polycyanurate resins. FIG. 2 shows a thermogravimetric analysis of PT-30 cyanate ester (among the most heat resistant) (green), amorphous polycarbonate (blue), and formulated phase separated mixture (red) with 10 phr amorphous polycarbonate in PT-30. The coincidence of the red and green curves indicates that no deleterious effect of the polycarbonate on thermal performance (in the absence of oxygen) takes place. FIG. 3 shows that unlike the typical polyimide (see T. Iijima, T. Kaise, M. Tomoi, J. Appl. Polym. Sci 88 (2003), 1), the addition of 10 phr APC does not significantly affect the weight gain of PT-30 in boiling water up to 1000 hrs.

Applications of APC-toughened cyanate ester resin include, but are not limited to: missile and aircraft airframes (parts that require continuous service temperatures of around 200 to 400° F.), radomes, firewalls, ship topside structures, solar concentrators, coatings for heat and fire resistance, insulation, including electrical conduits, printed circuit boards and chip housings, remotely operated sensor array housings, emergency response vehicles including fire truck, blast shields, engine or fuel cell housings, and emergency water dispensers/safety showers.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A polycyanurate composition of structure (I), comprising:

at least one semi-aliphatic polycarbonate, wherein said polycarbonate is liquefied;

at least one uncured reactive thermoset monomer;

wherein said liquefied polycarbonate is mixed with said uncured reactive thermoset monomer into a homogeneous liquid component;

wherein said liquid component is cured into a viscous component; and wherein said cured component is exposed to temperatures of about 50° C. to about 400° C. to form tricyanurate linkages in said polycyanurate composition (I)

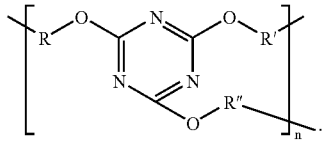

2. A polycyanurate composition of structure (I), comprising:
at least one semi-aliphatic polycarbonate, wherein said polycarbonate is liquefied;
at least one uncured reactive thermoset monomer;
wherein said liquefied polycarbonate is mixed with said uncured reactive thermoset monomer into a homogeneous liquid component;
wherein said liquid component is cured into a viscous component; and
wherein said cured component is exposed to temperatures of about 50° C. to about 400° C. to form tricyanurate linkages in said polycyanurate composition (I)

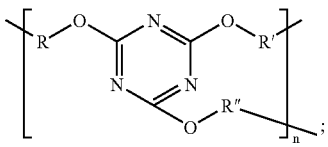

wherein said semi-aliphatic polycarbonate is a polycarbonate having a plurality of co-monomers wherein said polycarbonate has a molecular weight of about 1,000 to about 100,000 g/mol.

3. A polycyanurate composition of structure (I), comprising:
at least one semi-aliphatic polycarbonate, wherein said polycarbonate is liquefied;
at least one uncured reactive thermoset monomer;
wherein said liquefied polycarbonate is mixed with said uncured reactive thermoset monomer into a homogeneous liquid component;
wherein said liquid component is cured into a viscous component; and
wherein said cured component is exposed to temperatures of about 50° C. to about 400° C. to form tricyanurate linkages in said polycyanurate composition (I)

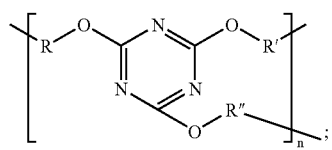

wherein said semi-aliphatic polycarbonate is a polycarbonate having an amorphous polycarbonate including a random co-polymer of polybisphenol A carbonate and 4,4'-(3,3,5-trimethylcyclohexylidene) diphenol carbonate of structure (II)

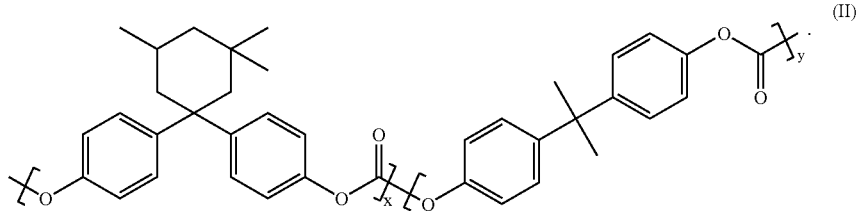

4. A polycyanurate composition of structure (I), comprising:
at least one semi-aliphatic polycarbonate, wherein said polycarbonate is liquefied;
at least one uncured reactive thermoset monomer;
wherein said liquefied polycarbonate is mixed with said uncured reactive thermoset monomer into a homogeneous liquid component;
wherein said liquid component is cured into a viscous component; and
wherein said cured component is exposed to temperatures of about 50° C. to about 400° C. to form tricyanurate linkages in said polycyanurate composition (I)

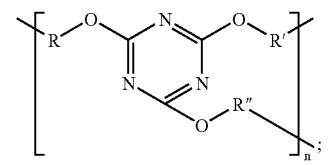

wherein said semi-aliphatic polycarbonate is a polycarbonate in the form of a powder, pellets, finely ground suspension, and any combination thereof.

5. A polycyanurate composition of structure (I), comprising:
at least one semi-aliphatic polycarbonate, wherein said polycarbonate is liquefied;
at least one uncured reactive thermoset monomer;
wherein said liquefied polycarbonate is mixed with said uncured reactive thermoset monomer into a homogeneous liquid component;
wherein said liquid component is cured into a viscous component; and wherein said cured component is exposed to temperatures of about 50° C. to about 400° C. to form tricyanurate linkages in said polycyanurate composition (I)

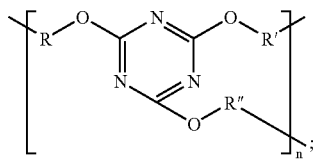

wherein said polycarbonate is liquefied through liquefaction by dissolution in a solvent with a high vapor pressure in said reactive monomer.

6. A polycyanurate composition of structure (I), comprising:
   at least one semi-aliphatic polycarbonate, wherein said polycarbonate is liquefied;
   at least one uncured reactive thermoset monomer;
   wherein said liquefied polycarbonate is mixed with said uncured reactive thermoset monomer into a homogeneous liquid component;
   wherein said liquid component is cured into a viscous component; and
   wherein said cured component is exposed to temperatures of about 50° C. to about 400° C. to form tricyanurate linkages in said polycyanurate composition (I)

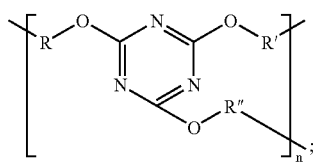

wherein said solvent is selected from the group of solvents consisting of methylene chloride, chloroform, carbon tetrachloride, 1,2-dichloroethane, 1,1,2-trichloroethane, 1,1,2,2-tetrachloroethane, cyclopentanone, cyclohexanone, acetone, methyl ethyl ketone, diethyl ether, tetrahydrofuran, acetonitrile, butyl acetate, 1,4-dioxane, ethyl acetate, ethylene glycol dimethyl ether, methyl sulfoxide, 1-pentanone, pyridine, and tetrachloroethylene.

7. A polycyanurate composition of structure (I), comprising:
   at least one semi-aliphatic polycarbonate, wherein said polycarbonate is liquefied;
   at least one uncured reactive thermoset monomer;
   wherein said liquefied polycarbonate is mixed with said uncured reactive thermoset monomer into a homogeneous liquid component;
   wherein said liquid component is cured into a viscous component; and
   wherein said cured component is exposed to temperatures of about 50° C. to about 400° C. to form tricyanurate linkages in said polycyanurate composition (I)

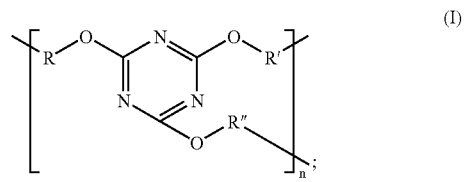

wherein said polycarbonate is liquefied through liquefaction by suspension directly into said reactive monomer.

8. A polycyanurate composition of structure (I), comprising:
   at least one semi-aliphatic polycarbonate, wherein said polycarbonate is liquefied;
   at least one uncured reactive thermoset monomer;
   wherein said liquefied polycarbonate is mixed with said uncured reactive thermoset monomer into a homogeneous liquid component;
   wherein said liquid component is cured into a viscous component; and
   wherein said cured component is exposed to temperatures of about 50° C. to about 400° C. to form tricyanurate linkages in said polycyanurate composition (I)

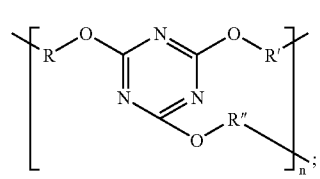

wherein said uncured reactive thermoset monomer is a reactive cyanate ester monomer of structure (III),

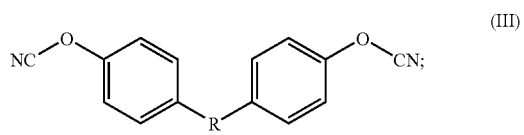

wherein R comprising at least one of C, H, N, O, F, Si, P, S, Cl, Br, I, and any combination thereof.

9. A polycyanurate composition of structure (I), comprising:
   at least one semi-aliphatic polycarbonate, wherein said polycarbonate is liquefied;
   at least one uncured reactive thermoset monomer;
   wherein said liquefied polycarbonate is mixed with said uncured reactive thermoset monomer into a homogeneous liquid component;
   wherein said liquid component is cured into a viscous component; and
   wherein said cured component is exposed to temperatures of about 50° C. to about 400° C. to form tricyanurate linkages in said polycyanurate composition (I)

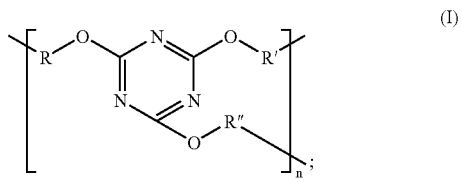
(I)

wherein said uncured reactive thermoset monomer is a reactive cyanate ester monomer of the novalac type of structure (IV)

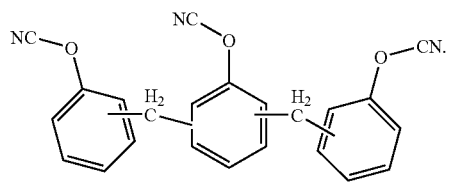
(IV)

10. A polycyanurate composition of structure (I), comprising:
   at least one semi-aliphatic polycarbonate, wherein said polycarbonate is liquefied;
   at least one uncured reactive thermoset monomer;
   wherein said liquefied polycarbonate is mixed with said uncured reactive thermoset monomer into a homogeneous liquid component;
   wherein said liquid component is cured into a viscous component; and
   wherein said cured component is exposed to temperatures of about 50° C. to about 400° C. to form tricyanurate linkages in said polycyanurate composition (I)

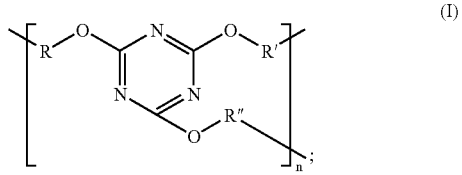
(I)

wherein said homogeneous liquid component is in the amount ranging from about 1 part to about 100 parts of said polycarbonate to about 100 parts of said reactive thermoset monomer.

11. A polycyanurate composition of structure (I), comprising:
   at least one semi-aliphatic polycarbonate, wherein said polycarbonate is liquefied;
   at least one uncured reactive thermoset monomer;
   wherein said liquefied polycarbonate is mixed with said uncured reactive thermoset monomer into a homogeneous liquid component;
   wherein said liquid component is cured into a viscous component; and
   wherein said cured component is exposed to temperatures of about 50° C. to about 400° C. to form tricyanurate linkages in said polycyanurate composition (I)

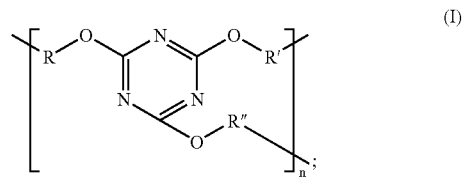
(I)

further comprising at least one liquid penetrating material including at least one of a polymeric, ceramic, and metal in the form of an insert, sheet, flake, powder, and fibrous matter.

12. A polycyanurate composition of structure (I), comprising:
   at least one semi-aliphatic polycarbonate, wherein said polycarbonate is liquefied;
   at least one uncured reactive thermoset monomer;
   wherein said liquefied polycarbonate is mixed with said uncured reactive thermoset monomer into a homogeneous liquid component;
   wherein said liquid component is cured into a viscous component; and
   wherein said cured component is exposed to temperatures of about 50° C. to about 400° C. to form tricyanurate linkages in said polycyanurate composition (I)

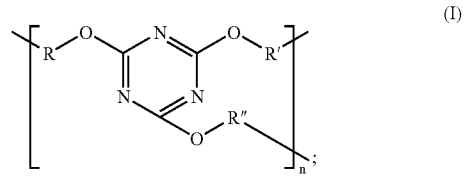
(I)

wherein said liquid component is heated up to about 200° C. to reach a viscosity of said liquid component to about 0.1 centipoise to about 1000 centipoises.

13. A polycyanurate composition of structure (I), comprising:
   at least one semi-aliphatic polycarbonate, wherein said polycarbonate is liquefied;
   at least one uncured reactive thermoset monomer;
   wherein said liquefied polycarbonate is mixed with said uncured reactive thermoset monomer into a homogeneous liquid component;
   wherein said liquid component is cured into a viscous component; and
   wherein said cured component is exposed to temperatures of about 50° C. to about 400° C. to form tricyanurate linkages in said polycyanurate composition (I)

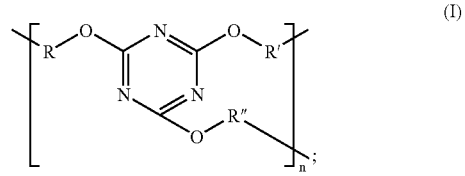
(I)

wherein the length of time cured of said cured component depends on variables including ratios and chemical compositions of polycarbonates to said solvent to said reactive monomer to produce a composition having a structure of dispersed or interconnected domains of polycarbonate with a characteristic length scale ranging from about 0.001 micrometers to about 10 micrometers.

* * * * *